United States Patent
DesOrmeaux

(10) Patent No.: US 10,632,512 B2
(45) Date of Patent: Apr. 28, 2020

(54) DEVICES, SYSTEMS, AND METHODS FOR CLEANING VESSELS

(71) Applicant: ECOSERV TECHNOLOGIES, LLC, Abbeville, LA (US)

(72) Inventor: Kenny DesOrmeaux, Abbeville, LA (US)

(73) Assignee: ECOSERV TECHNOLOGIES, LLC, Abbeville, LA (US)

( * ) Notice: Subject to any disclaimer, the term of this patent is extended or adjusted under 35 U.S.C. 154(b) by 56 days.

(21) Appl. No.: 15/989,628

(22) Filed: May 25, 2018

(65) Prior Publication Data

US 2018/0339318 A1   Nov. 29, 2018

Related U.S. Application Data

(60) Provisional application No. 62/511,337, filed on May 25, 2017.

(51) Int. Cl.
*B08B 9/093* (2006.01)
*B08B 5/04* (2006.01)
(Continued)

(52) U.S. Cl.
CPC ............ *B08B 9/0936* (2013.01); *B08B 1/002* (2013.01); *B08B 1/04* (2013.01); *B08B 3/02* (2013.01); *B08B 3/08* (2013.01); *B08B 5/04* (2013.01); *B08B 7/0035* (2013.01); *B08B 7/0042* (2013.01); *B08B 7/0071* (2013.01);
(Continued)

(58) Field of Classification Search
None
See application file for complete search history.

(56) References Cited

U.S. PATENT DOCUMENTS 2,896,643 A   7/1959 Ottoson
3,606,162 A   9/1971 Lehmann
(Continued)

FOREIGN PATENT DOCUMENTS

CN   102825040   12/2012
CN   102764750   2/2014
(Continued)

OTHER PUBLICATIONS

PCT/US2018/034592, "International Search Report and Written Opinion", Aug. 21, 2018, 10 pages.
(Continued)

*Primary Examiner* — Eric W Golightly
*Assistant Examiner* — Arlyn I Rivera-Cordero
(74) *Attorney, Agent, or Firm* — Kilpatrick Townsend & Stockton LLP

(57) ABSTRACT

A cleaning system includes a cleaning apparatus that is positionable in a cleaning environment and a cleaning processing device. The cleaning apparatus includes a sensor and a cleaning device. The sensor is configured to measure a depth of a target material on a surface of the vessel, and the cleaning device is configured to generate a cleaning force. The cleaning processing device is configured to receive a plurality of depth measurements of the target material on the surface, determine a cleaning protocol for the cleaning device on the surface based on the plurality of depth measurements, and control the cleaning apparatus to cause the cleaning device to apply the cleaning force to the surface pursuant to the cleaning protocol.

20 Claims, 10 Drawing Sheets

(51) Int. Cl.
  *B08B 7/00* (2006.01)
  *B08B 7/02* (2006.01)
  *B08B 9/08* (2006.01)
  *B08B 1/00* (2006.01)
  *B08B 1/04* (2006.01)
  *B08B 3/02* (2006.01)
  *B08B 3/08* (2006.01)
  *G01S 17/10* (2020.01)
  *B08B 9/087* (2006.01)

(52) U.S. Cl.
  CPC .............. *B08B 7/028* (2013.01); *B08B 9/087* (2013.01); *B08B 9/0933* (2013.01); *G01S 17/10* (2013.01); *B08B 2209/08* (2013.01)

(56) References Cited

U.S. PATENT DOCUMENTS

| | | | |
|---|---|---|---|
| 3,664,355 A | 5/1972 | Adams | |
| 3,677,422 A | 7/1972 | Meyers et al. | |
| 3,881,618 A | 5/1975 | Tausheck | |
| 3,900,968 A | 8/1975 | Shigyo | |
| 4,244,749 A | 1/1981 | Sachs et al. | |
| 4,817,653 A | 4/1989 | Krajicek et al. | |
| 4,828,625 A | 5/1989 | Moran | |
| 4,941,493 A | 7/1990 | Wieringa | |
| 5,037,486 A | 8/1991 | Sloan | |
| 5,093,949 A | 3/1992 | Sloan | |
| 5,335,395 A | 8/1994 | Allen | |
| 5,518,553 A | 5/1996 | Moulder | |
| 5,561,883 A | 10/1996 | Landry et al. | |
| 5,579,787 A | 12/1996 | Wood | |
| 5,640,982 A | 6/1997 | Landry et al. | |
| 5,740,821 A | 4/1998 | Arnold | |
| 5,876,512 A | 3/1999 | Desormeaux et al. | |
| 5,967,160 A | 10/1999 | Rochette et al. | |
| 6,021,793 A | 2/2000 | Moulder | |
| 6,039,056 A | 3/2000 | Verbeek | |
| 6,141,810 A | 11/2000 | Allen et al. | |
| 6,179,929 B1 | 1/2001 | Gudini et al. | |
| 6,321,754 B1 | 11/2001 | Manabe et al. | |
| 7,261,109 B2 | 8/2007 | Luke et al. | |
| 7,635,854 B1 | 12/2009 | Babin | |
| 8,133,328 B2 | 3/2012 | Delaney et al. | |
| 8,260,483 B2 | 9/2012 | Barfoot et al. | |
| 8,942,940 B2 | 1/2015 | York | |
| 8,965,571 B2 | 2/2015 | Peters et al. | |
| 8,997,362 B2 | 4/2015 | Briggs et al. | |
| 9,061,736 B2 | 6/2015 | Smith | |
| 9,739,792 B2 | 8/2017 | Atwood et al. | |
| 9,883,783 B2 | 2/2018 | Landry et al. | |
| 2002/0069897 A1 | 6/2002 | Emrey | |
| 2005/0098196 A1 | 5/2005 | Hebert | |
| 2008/0047587 A1 | 2/2008 | Ball et al. | |
| 2008/0142042 A1 | 6/2008 | Bramsen | |
| 2009/0056751 A1 | 3/2009 | Roscoe | |
| 2009/0188535 A1 | 7/2009 | Taylor et al. | |
| 2009/0211605 A1 | 8/2009 | Ahmad | |
| 2011/0126857 A1 | 6/2011 | Kaipainen | |
| 2011/0126862 A1 | 6/2011 | Rancich | |
| 2011/0315164 A1 | 12/2011 | Desormeaux | |
| 2011/0315166 A1 | 12/2011 | Shecterle et al. | |
| 2012/0067372 A1 | 3/2012 | O'Quinn et al. | |
| 2013/0074885 A1 | 3/2013 | Rancich | |
| 2013/0269150 A1 | 10/2013 | Hartley et al. | |
| 2015/0122293 A1 | 5/2015 | DesOrmeaux | |
| 2015/0218024 A1 | 8/2015 | Haase et al. | |
| 2016/0008859 A1 | 1/2016 | Høxbroe | |
| 2017/0203342 A1 | 7/2017 | Hunter | |
| 2018/0000305 A1 | 1/2018 | Schultink et al. | |
| 2018/0070787 A1 | 3/2018 | Gordon et al. | |

FOREIGN PATENT DOCUMENTS

| | | |
|---|---|---|
| CN | 105278431 | 1/2016 |
| CN | 106077001 | 11/2016 |
| DE | 102012011788 | 12/2013 |
| EP | 0400025 | 9/1993 |
| GB | 2478330 | 9/2011 |

OTHER PUBLICATIONS

U.S. Appl. No. 14/749,347, "Final Office Action", dated Jan. 24, 2018, 29 pages.

U.S. Appl. No. 14/749,347, "Non-Final Office Action", dated Jun. 15, 2017, 30 pages.

U.S. Appl. No. 14/875,425, "Advisory Action", dated Mar. 20, 2019, 4 pages.

U.S. Appl. No. 14/875,425, "Final Office Action", dated Dec. 27, 2018, 17 pages.

U.S. Appl. No. 14/875,425, "Non-Final Office Action", dated Jun. 27, 2019, 18 pages.

U.S. Appl. No. 16/306,293, "Non-Final Office Action", dated Oct. 3, 2019, 14 pages.

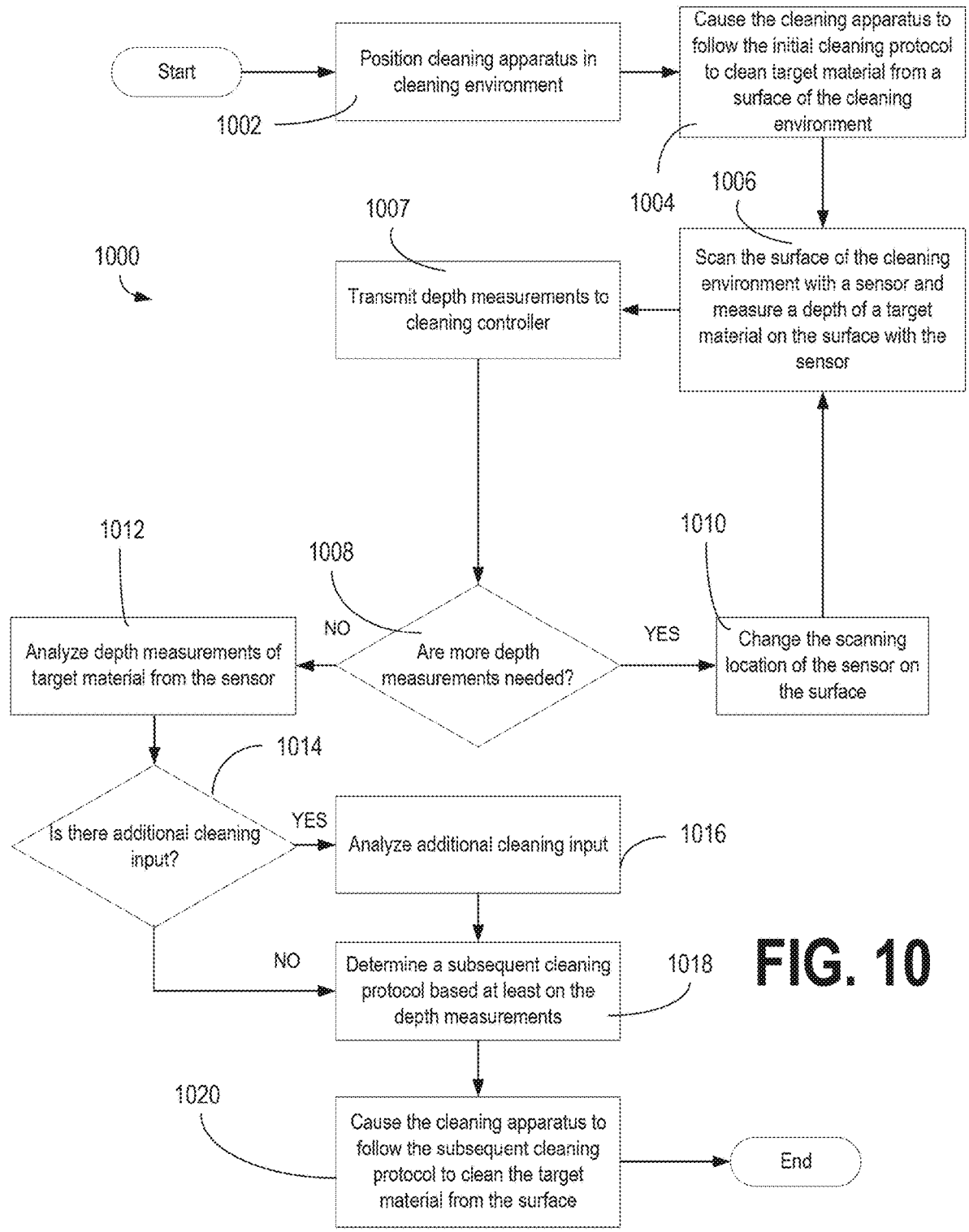

DEVICES, SYSTEMS, AND METHODS FOR CLEANING VESSELS

REFERENCE TO RELATED APPLICATION

This application claims the benefit of U.S. Provisional Application No. 62/511,337, filed May 25, 2017, and entitled APPARATUS, SYSTEMS, AND METHODS FOR CLEANING VESSELS, the content of which is hereby incorporated by reference in its entirety.

FIELD OF THE INVENTION

The present disclosure relates to surface-cleaning devices. More specifically, but not by way of limitation, this disclosure relates to fluidizing and removing material from the surface based on a depth of the material.

BACKGROUND

Conventional tank cleaning is often a long, stringent, hazardous, and labor-intensive task. Conventional methods of tank and vessel cleaning require operator exposure to dangerous environments.

Existing remote tank cleaning systems include a nozzle configured to direct a fluid stream to dislodge, dilute, or dissolve settled solids from tank interiors. These systems generally require extensive mounting or setup within the tanks or containers prior to cleaning, during which workers may be subject to prolonged exposures to the contents being cleaned. Additionally, existing tank cleaning systems use fluid directing systems that result in random, wasted movement. For example, some cleaning systems utilize nozzles that perform cleaning via a 360° spherical spray pattern/movement. However, in these systems, cycle of a nozzle cannot be controlled once activated, thereby increasing the difficulty of focusing on specific areas in need of cleaning Accordingly, a need exists for an improved apparatus, system, and method to remotely remove materials, including settled solids, fluids, slurries, and/or sludge, from a vessel, container, and/or tank interior in a manner that is more efficient and safer than existing systems.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Aspects and examples covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to some aspects, a method of cleaning a vessel with a cleaning apparatus includes positioning a cleaning apparatus in a cleaning environment of the vessel. The cleaning apparatus includes a sensor and a cleaning device, which generates a cleaning force. The cleaning apparatus measures, with the sensor, a plurality of depth measurements along a surface of the cleaning environment of a material to be cleaned from the surface. For example, the sensor can scan the surface of the cleaning environment. The sensor communicates the plurality of depth measurements to a cleaning processing device. The cleaning processing device analyzes the plurality of depth measurements and determines a cleaning protocol for the cleaning device based (at least in part) on the plurality of depth measurements. The cleaning process controls the cleaning apparatus by causing the cleaning device to follow the cleaning protocol to clean the material from the surface.

According to various aspects, a method of cleaning a vessel includes positioning a cleaning apparatus in a cleaning environment of the vessel. The cleaning apparatus includes a sensor and a cleaning device that is configured to generate a cleaning force. A cleaning processing device controls the cleaning apparatus in a first cleaning stage by causing the cleaning device to follow an initial cleaning protocol to clean a material from a surface of the cleaning environment. The sensor measures a plurality of depth measurements of the material along the surface by scanning the surface of the cleaning environment with the sensor after the first cleaning stage. The sensor communicates the plurality of depth measurements to the cleaning processing device, and the cleaning processing device analyzes the plurality of depth measurements. Based on the plurality of depth measurements, the cleaning processing device determines a subsequent cleaning protocol for the cleaning device and controls the cleaning apparatus in a second cleaning stage by causing the cleaning device to follow the subsequent cleaning protocol to clean the material from the surface.

According to certain aspects, a cleaning system for cleaning a vessel includes a cleaning apparatus and a cleaning processing device. The cleaning apparatus is positionable in a cleaning environment of the vessel and includes a sensor configured to measure a depth of a target material on a surface of the vessel and a cleaning device configured to generate a cleaning force. The cleaning processing device is configured to receive a plurality of depth measurements of the target material on the surface, determine a cleaning protocol on the surface for the cleaning device based on the plurality of depth measurements, and control the cleaning apparatus to cause the cleaning device to apply the cleaning force to the surface pursuant to the cleaning protocol.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

FIG. 10 depicts an example of a method of cleaning a vessel according to certain aspects of the present disclosure.

DETAILED DESCRIPTION

The subject matter of aspects of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "left," "right," "front," and "back," among others are intended to refer to the orientation as illustrated and described in the figure (or figures) to which the components and directions are referencing.

Figure 1:
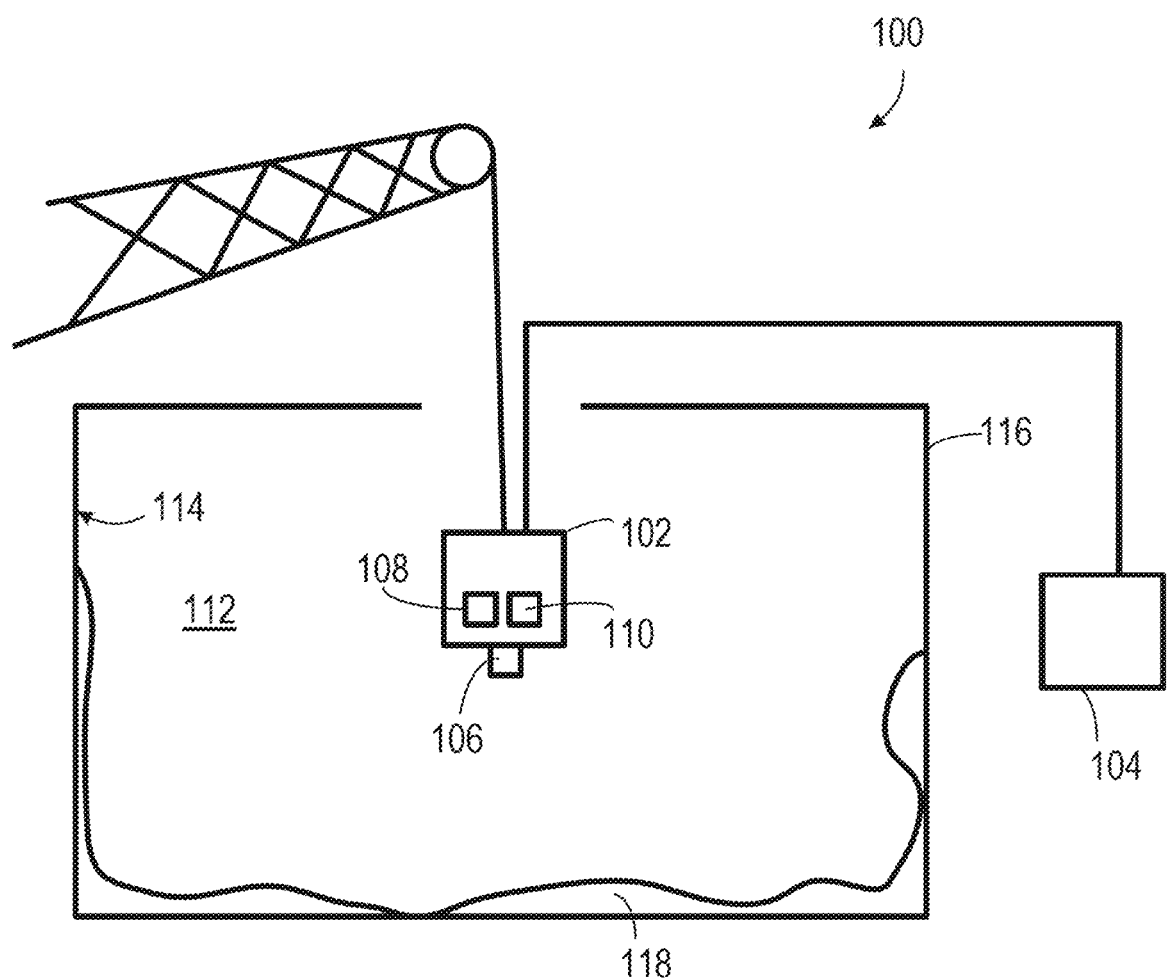
FIG. 1 depicts an example of a cleaning system that includes a cleaning apparatus according to certain aspects of the present disclosure.

FIG. 1 illustrates a cleaning system 100 according to certain aspects of the present disclosure. The cleaning system 100 includes a cleaning apparatus 102 and a cleaning controller 104. The cleaning apparatus 102 includes a cleaning device 106 and a sensor 108. In some aspects, the cleaning apparatus includes a removal device 110, although it need not in other examples.

During a cleaning process using the cleaning system 100, the cleaning apparatus 102 is positioned in a cleaning environment 112 having at least one surface 114 to be cleaned. In various aspects, the cleaning environment 112 includes a vessel 116, and the surface 114 is a surface of the vessel 116. In certain examples, the cleaning environment 112 includes an interior space of the vessel 116, and the surface 114 is an inner surface of the vessel 116. In other examples, the surface 114 is an exterior surface of the vessel 116. The vessel 116 may be a storage tank, storage unit, transportation vessel, tanker trailer, and/or tanker railcar, although the cleaning system 100 may be utilized with other vessels or cleaning environments having surfaces to be cleaned. As illustrated in FIG. 1, the vessel 116 may have target material 118 to be removed from the surface 114. The target material 118 may be various materials to be removed from the cleaning environment 112 including, but not limited to, sludge, settled solids, fluids, slurries, chemicals, by-products, minerals, oils, vessel linings (e.g., natural or synthetic vessel linings such as paint, polymer linings, fiberglass linings, etc.), and/or various other materials.

In various examples, the cleaning apparatus 102 may be movable along and/or relative to the surface 114 in the cleaning environment 112. As some examples, the cleaning apparatus 102 may be track-mounted, may include rails, may include rollers, or may include various other mechanisms such that the cleaning apparatus 102 is movable along the surface 114. Examples of movable cleaning apparatuses are described in U.S. patent application Ser. No. 13/135,018 ("the '018 Application"), U.S. patent application Ser. No. 14/530,455 ("the '455 Application"), U.S. patent application Ser. No. 14/875,425 ("the '425 Application"), and U.S. patent application Ser. No. 15/786,320 ("the '320 Application"), all of which are hereby incorporated by reference in their entireties.

In other examples, a base of the cleaning apparatus 102 may be mounted and/or positioned at a predetermined location relative to the surface 114 and the cleaning device 106 may be positionable or movable relative to the base of the cleaning apparatus 102. In further examples, the base of the cleaning apparatus 102 and the cleaning device 106 are independently movable. As some examples, the cleaning apparatus 102 may include a support device for the cleaning device 106 such that the cleaning device 106 is movable relative to the base of the cleaning apparatus 102. Support devices include, but are not limited to, articulating arms, telescoping arms, rails, jointed segments, or various other suitable support mechanisms. In such examples, the base of the cleaning apparatus may be movable relative to the surface 114 or may be supported at a predetermined or fixed location relative to the surface 114 through various mounting mechanisms. Mounting mechanisms include, but are not limited to, magnets, vessel opening mounts, tethers, bolts, or various other suitable mechanisms for maintaining a position of the base of the cleaning apparatus 102 relative to the surface 114. Examples of cleaning apparatuses where the cleaning device is movable relative to a base of the cleaning apparatus and/or where the base is at a fixed location relative to the surface are described in the '018 Application, the '455 Application, the '425 Application, and the '320 Application.

During the cleaning process, the cleaning device 106 can generate a cleaning force applied to the surface 114 such that the target material 118 is dislodged and/or removed from the surface 114. In some examples, the cleaning device 106 includes a tool including, but not limited to, a claw, a brush, a hammer, or other mechanical device configured to contact the target material 118 as the type of cleaning force. In other examples, the cleaning device 106 is a nozzle or other suitable device configured to emit heat, air, high-intensity light (e.g., laser light or other suitable light), acoustic waves, sonic waves, and/or fluids as the type of cleaning force. In one example, the cleaning device 106 is a nozzle that emits water at elevated pressures. Various cleaning additives may be emitted as part of the cleaning force including, but not limited to, detergents, soaps, chemicals, solvents, or other suitable additives as desired.

The removal device 110 is optionally provided to remove the target material 118 from the cleaning environment after the target material 118 has been dislodged from the surface 114. In one example, the cleaning removal device 110 includes a vacuum or suction line for removing the target material and/or fluid, although various other suitable types of removal devices 110 may be utilized.

The cleaning apparatus 102 includes the at least one sensor 108. Although one sensor 108 is illustrated in FIG. 1, any number of sensors 108 may be provided as desired including, but not limited to, two sensors, three sensors, four sensors, five sensors, etc. In various examples, the sensor 108 is a light detection and ranging ("LIDAR") sensor that is controlled to detect a depth of the target material 118 on the surface 114 during the cleaning process. For example, the depth may be measured by illuminating a particular area with pulsed laser light and measuring aspects of the reflected pulses (e.g., laser return times, wavelengths, etc.). Various other additional and/or alternative sensors 108 to LIDAR sensors include, but are not limited to, x-ray, gamma-ray, ultrasound, and/or acoustic sensors.

In some aspects, in addition to measuring the depth of the target material 118, the sensor 108 measures an integrity of the surface 114. In some aspects, the sensor 108 measures the integrity of the surface 114 after cleaning of the target material 118 has concluded. In certain examples, the sensor 108 measures the integrity of the surface 114 by measuring a dimension of the cleaning environment 112 and comparing the measured dimension to a predefined dimension. The integrity of the surface 114 includes, but is not limited to, a thickness of the surface, surface roughness, surface waviness, other surface flaws, plastic deformation, residual stresses, cracks, hardness, overaging, phase changes, embrittlement, or various other characteristics of the surface The cleaning controller 104 communicates data with one or more of the cleaning device 106 and the sensor 108. In some aspects, the cleaning controller 104 also communicates data with the removal device 110. The data communication may be wireless or wired communication, or combinations thereof.

In some aspects, the cleaning controller 104 is remote from the cleaning apparatus 102. For instance, in FIG. 1, the cleaning controller 104 is remote from the cleaning environment 112. In other aspects, such as the example depicted in FIG. 2, the cleaning controller 104 is provided on the cleaning apparatus 102 such that the cleaning controller is in the cleaning environment 112 with the cleaning apparatus 102. The cleaning controller 104 can include one or more processing devices that execute instructions stored on a memory. Executing the instructions can cause the cleaning controller 104 to determine a cleaning protocol for the cleaning apparatus 102 for removal of the target material 118. A cleaning protocol can include, but is not limited to, one, some or all of the path that the cleaning apparatus 102 follows within the cleaning environment 112, the speed at which the cleaning moves or operates within the cleaning environment 112, the force at which the cleaning apparatus 102 emits cleaning solution or other medium for cleaning, an amount of cleaning solution, an orientation of the cleaning apparatus 102, sensor 108, and/or cleaning device 106 within the cleaning environment 112, a number of cleaning passes over a particular location within the cleaning environment 112, the duration of time the cleaning apparatus 102 focuses on a particular location within the cleaning environment 112, the activation/de-activation of the removal device 110, the location of the removal device 110 relative to the cleaning device 106, etc. For instance, the cleaning controller 104 can compute a cleaning path based (in part) on the depth measurements from the sensor 108 and cause the cleaning apparatus 102 to clean the vessel 116 using the cleaning path. Causing the cleaning apparatus 102 to clean the vessel 116 using the cleaning path can include, for example, transmitting one or more control signals to the cleaning apparatus 102. A control signal can cause the cleaning apparatus 102 to apply the cleaning force and/or activate the removal device 110 and to move certain distances, certain speeds, certain directions, etc. that define the cleaning path while the cleaning force is applied and/or the removal device 110 is activated.

In various aspects, the cleaning controller 104 can include one or more of a general purpose processing unit, a processor specially designed for depth measurement analysis and/or cleaning control applications, a processor specially designed for wireless communications (such as a Programmable System On Chip (PSOC) from Cypress Semiconductor or other suitable processors). A memory may be provided with the cleaning controller 104, although it need not in other examples. The memory may include a long-term storage memory and/or a short-term working memory. The memory may be used by the cleaning controller 104 to store a working set of processor instructions. The processor may write data to the memory. The memory may include a traditional disk device. In some aspects, the memory could include either a disk based storage device or one of several other type storage mediums to include a memory disk, USB drive, flash drive, remotely connected storage medium, virtual disk drive, or the like.

Various other features including, but not limited to, a communication circuit/unit, an optional display, an optional speaker, and/or power storage unit may also be included in the cleaning controller 104 (e.g., in the remote example of a cleaning controller 104 depicted in FIG. 1). In some aspects, some or all of the components of the cleaning controller 104 may be included together in a single package or sensor suite, such as within the same enclosure. In additional or alternative aspects, some of the components may be included together in an enclosure and the other components may be separate. Thus, the cleaning controller 104 may be a distributed system. This is merely one example and other configurations may be implemented.

In various aspects, the cleaning controller 104 communicates data with the sensor 108 such that the cleaning controller 104 receives a data signal from the sensor 108. In various aspects, the data signal from the sensor 108 includes a plurality of depth measurements of the target material 118 to be cleaned by the cleaning system 100. In certain examples, the data signal is sent continuously from the sensor 108 to the cleaning controller 104 (i.e., the data signal is sent as soon as a depth measurement is made by the sensor 108). In other examples, the sensor 108 sends the data signal after a predetermined number of depth measurements have been measured by the sensor 108 (i.e., the data signal is not sent continuously). In one example, the data signal is sent by the sensor 108 after the sensor 108 has concluded measuring the depth of the target material 118 at various locations along the surface 114.

The cleaning controller 104 can analyze the depth measurements from the sensor 108 and determine a cleaning protocol based on the depth measurements. In some aspects, analyzing the depth measurements includes comparing the measured depth with a predefined depth for a particular location along the surface 114. In some aspects, the predefined depth corresponds with a depth of the target material 118 that is considered "clean" (which can be a target material 118 depth of zero or some minimally acceptable depth or some other predefined depth), although it need not in other examples. In various examples, determining the cleaning protocol includes determining a location of cleaning by the cleaning apparatus 102 along the surface 114 at a particular time period during a cleaning time period based on the depth measurements.

In some aspects, and in addition to the depth measurements, the cleaning controller 104 may determine the cleaning protocol based on a shape or profile of the surface 114, a type of cleaning device 106, a type of cleaning force from the cleaning device 106, a type of material of the target material 118, and/or various other factors as desired. As some examples, a surface having a rectangular profile may result in a first cleaning protocol and a surface having a cylindrical profile may result in a second cleaning protocol that is different from the first cleaning protocol. Similarly, a cleaning device that is mounted or supported at a single location during cleaning (e.g., a cleaning device similar to that depicted in FIGS. 4 and 5) may result in a first cleaning protocol and a cleaning device that is movable along the surface (e.g., through a track, rollers, endless track, etc.) may result in a second cleaning protocol that is different from the first cleaning protocol due to the different types of movement that can be achieved by the respective devices. As another example, a cleaning device that utilizes pressurized fluid as the type of cleaning force may result in a first cleaning protocol and a cleaning device that utilizes heat, a mechanical force, or other type of cleaning force may result in a second cleaning protocol different from the first cleaning protocol due to the rate of cleaning that can be achieved by the respective devices. As a further example, a cleaning device that can achieve a first amount of cleaning within a predetermined time period may result in a first cleaning protocol and a cleaning device that can achieve a second amount of cleaning within the same time period may result in a second cleaning protocol that is different from the first cleaning protocol. A target material that is more compacted or solidified may result in a first cleaning protocol compared to a cleaning protocol for a target material that is sludge or more loosely compacted. Moreover, various combinations of the additional cleaning input in addition to the depth measurements may result in cleaning protocols that are the same or different.

In certain examples, the cleaning controller 104 communicates a cleaning signal to the cleaning device 106. The cleaning signal causes the cleaning device 106 to apply the cleaning force on the surface 114 based on the cleaning protocol. For instance, the cleaning signal causes the cleaning device to apply the cleaning force on a predetermined location on the surface 114 for a predetermined time period during the cleaning time period based on the depth measurements. Causing the cleaning device 106 to apply the cleaning force can also include, but is not limited to, moving the cleaning device 106 certain distances, certain angular positions, certain speeds, certain directions, making the cleaning device 106 apply a type or amount of cleaning force, etc. In some aspects, the cleaning signal causes the entire cleaning apparatus to move along the surface 114 such that the cleaning device 106 cleans the surface 114 following the predetermined cleaning protocol. Causing the cleaning apparatus 102 to move may include, but is not limited to, activating a track system, a motor of the cleaning apparatus, wheels, rollers, endless tracks, a rotational position, controlling a speed and/or direction of the cleaning apparatus 102, etc. In other examples, the cleaning signal causes the cleaning device 106 to move and/or orient itself relative to a base of the cleaning apparatus 102. Causing the cleaning device 106 to move relative to the base of the cleaning apparatus 102 may include, but is not limited to, activating motors or controllers of arm segments of an articulating arm such that each arm segment is adjusted about an axis of the arm. In various examples, the base of the cleaning apparatus 102 may be independently movable relative to the surface or may be at a fixed location relative to the surface 114.

In some aspects, the cleaning signal also causes the removal device 110 of the cleaning apparatus 102 to remove the targeted material 118 from the cleaning environment 112 after the targeted material 118 has been dislodged (or otherwise removed) from the surface 114 by the cleaning device 106. In various examples, causing the removal device 110 to remove the targeted material 118 may include activating a vacuum or suction device and directing a hose or other intake device to the targeted material 118 such that it may be removed through vacuuming or suctioning In other examples, other removal techniques may be utilized by the removal device 110.

In some examples, the cleaning controller 104 can also cause the sensor 108 to measure an integrity of the surface 114. In such examples, the cleaning controller 104 may move or position the cleaning apparatus 102 or only the sensor 108 while the sensor 108 scans the surface 114. In some aspects, the cleaning controller 104 sends an integrity signal to the sensor 108 after the cleaning process has concluded, although the integrity signal may be transmitted in other time periods in other examples. The integrity signal causes the sensor 108 to measure a dimension of the cleaning environment 112. For example, the dimension may be measured by illuminating a particular area with pulsed laser light and measuring aspects of the reflected pulses (e.g., laser return times, wavelengths, etc.). The measured dimension may be transmitted from the sensor 108 to the cleaning controller 104 continuously or at predetermined time periods as described previously. The cleaning controller 104 analyzes the measured dimension by comparing the measured dimension to a predefined dimension of the surface 114. In some aspects, the cleaning controller 104 transmits an integrity signal with an integrity alert if the measured dimension deviates from the predefined dimension more than predetermined tolerance levels. In some examples, the cleaning controller 104 may cause the cleaning system 100 to start another cleaning process if the measured dimension is different from the predefined dimension. As one non-limiting example, the predefined dimension may be an expected dimension, such as a predetermined distance between the sensor 108 (at a predefined location) and a particular location in the cleaning environment 112, or may be a predetermined distance between two locations in the cleaning environment 112. The cleaning controller 104 may cause the sensor 108 to measure the actual dimension (e.g., the actual distance between the sensor 108 and the particular location and/or the actual distance between the two locations). In some cases, a difference or deviation of the measured dimension from the predefined/expected dimension may indicate a surface integrity issue such as cracking, bowing, erosion, etc. of the surface that needs to be corrected or examined before using the cleaning environment.

It will be appreciated that the depth measurements, determining the cleaning protocol, cleaning, determining the integrity, etc. may be performed sequentially or concurrently. For example, in some cases, the depth measurements, determining the cleaning protocol, and cleaning may be performed concurrently such that the cleaning protocol is updated in real time and/or the cleaning system 100 can adjust to changes in cleaning environment, etc., as they occur.

Figure 2:
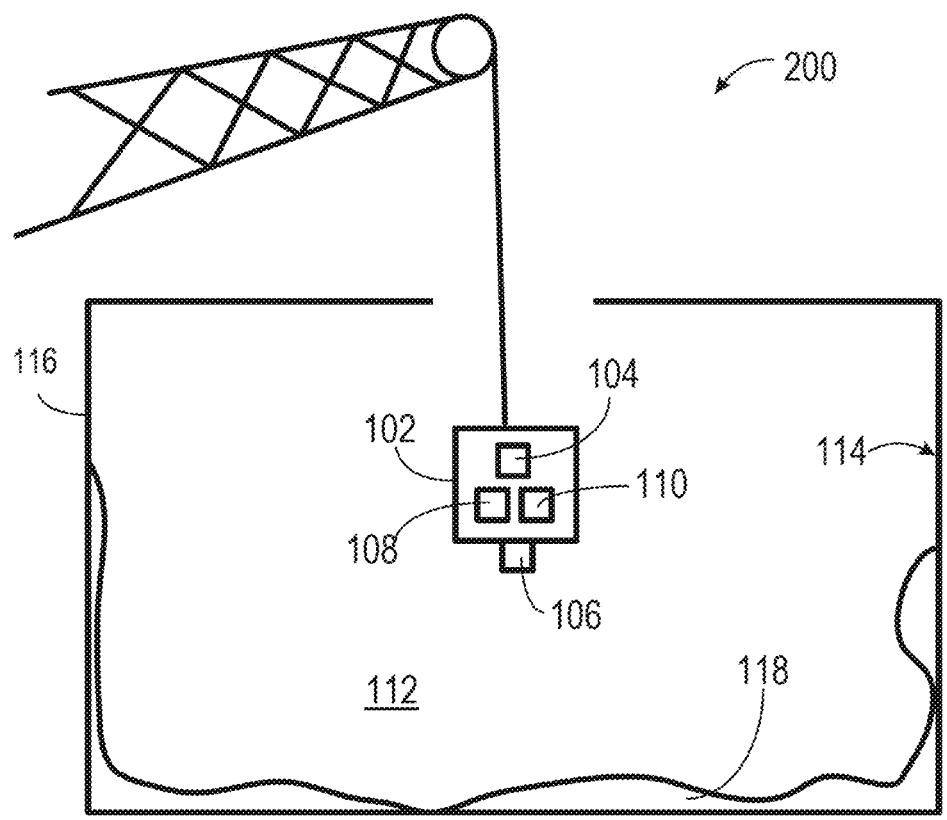
FIG. 2 depicts an alternative example of a cleaning system that includes a cleaning apparatus according to certain aspects of the present disclosure.

FIG. 2 illustrates a cleaning system 200 that is substantially similar to the cleaning system 100 except that the cleaning controller 104 is on the cleaning apparatus 102. In such examples, the cleaning controller 104 is positioned within the cleaning environment 112 during cleaning with the cleaning system 100.

Figure 3:
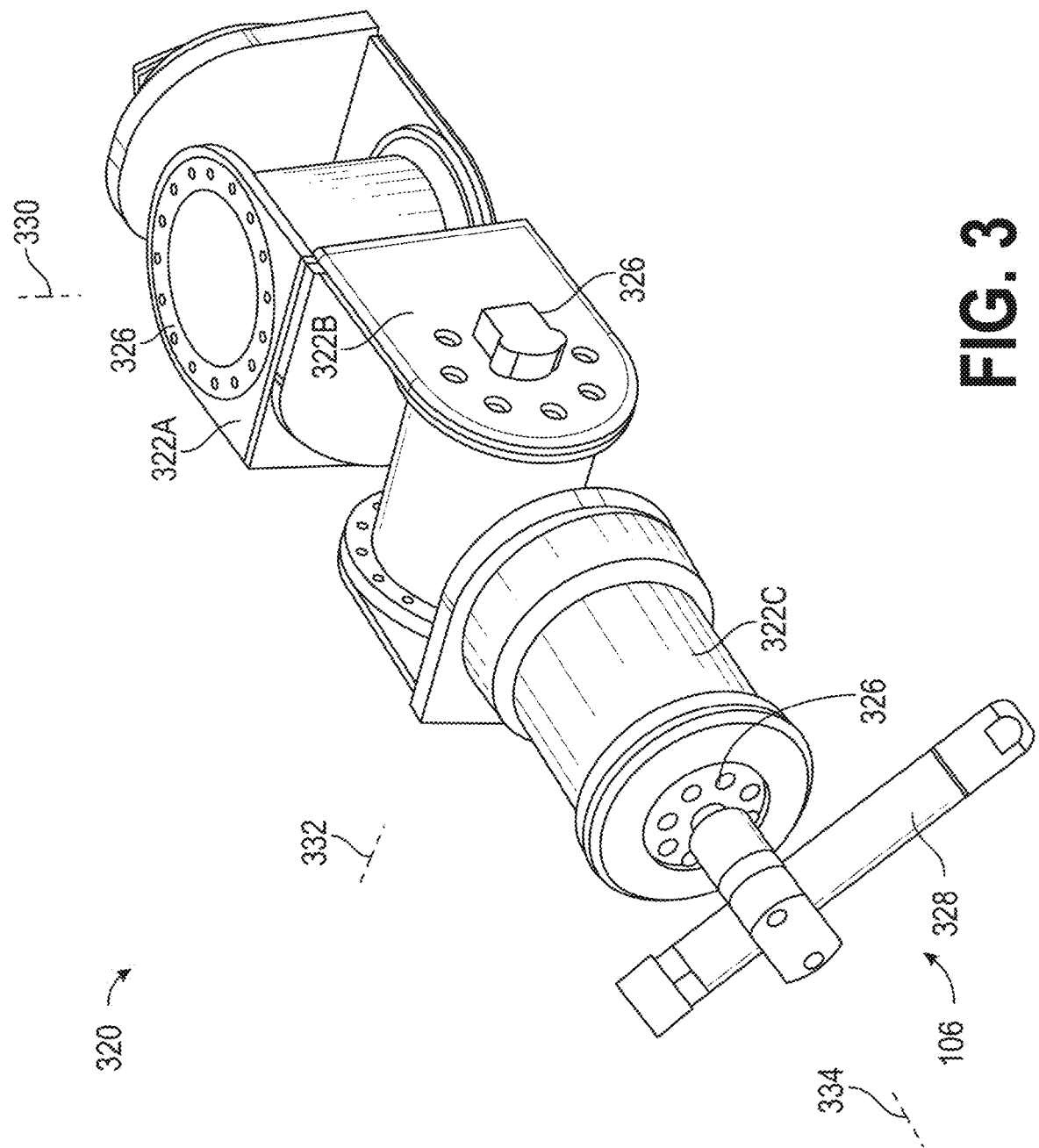
FIG. 3 depicts an example of an articulating arm of a cleaning apparatus according to certain aspects of the present disclosure.

FIG. 3 illustrates an example of an articulating arm 320 that may be provided with the cleaning apparatus 102 of FIG. 1. As illustrated in FIG. 3, the articulating arm 320 may support the cleaning device 106 for the cleaning apparatus. In the example of FIG. 3, the cleaning device 106 is a nozzle 328 that provides fluid, such as water or other fluids, at high pressures to fluidize the target material 118. In one example, the nozzle 328 can provide fluid flow of approximately 100 GPM at approximately 900 PSI, although various other flow rates and pressures may be utilized. Although a single nozzle is illustrated, any number of nozzles and/or other cleaning devices may be provided as the cleaning device 306.

As illustrated in FIG. 3, the articulating arm 320 includes a plurality of connected arm segments 322A-C. In certain examples, one of the arm segments 322A-C may be mounted or otherwise secured to a base of a cleaning apparatus. Each arm segment 322A-C is rotatable about an axis 330, 332, 334, respectively, such that the articulating arm 320 may be manipulated in a variety of directions to position the cleaning device 106. Although three arm segments are illustrated, the number of articulating arm segments should not be considered limiting on the current disclosure. For example, the articulating arm 320 may have one arm segment such that the articulating arm 320 may be manipulated about a single axis, two arm segments such that the articulating arm 320 may be manipulated about two axes, or more than three axes such that the articulating arm 320 may be manipulated about more than three axes.

In some aspects, one or more of the arm segments 322A-C includes a position sensor 326 that detects a rotary angle or position of the respective arm segment. In certain examples, the arm segments 322A-C and/or position sensors 326 are in data communication with the cleaning controller 104. In some cases, the cleaning controller 104 receives position data from one or more of the arm segments 322A-C. In various examples, the cleaning signal from the cleaning controller 104 causes one or more of the arm segments 322A-C to move to a particular angular position at a particular time period and location of the cleaning device along the cleaning path. Articulating arm 320 and/or parts thereof are more fully described in the '018 Application, the '455 Application, the '425 Application, and the '320 Application.

Figure 4:
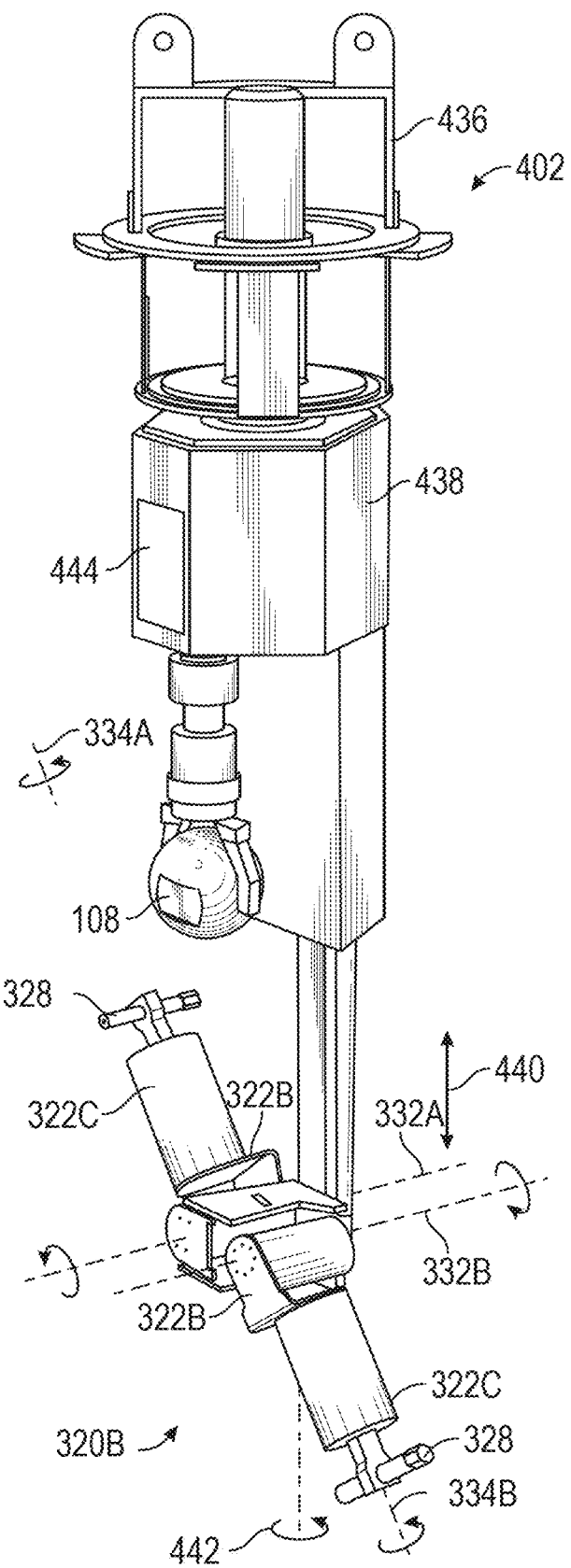
FIG. 4 depicts an example of a cleaning apparatus according to certain aspects of the present disclosure.
Figure 5:
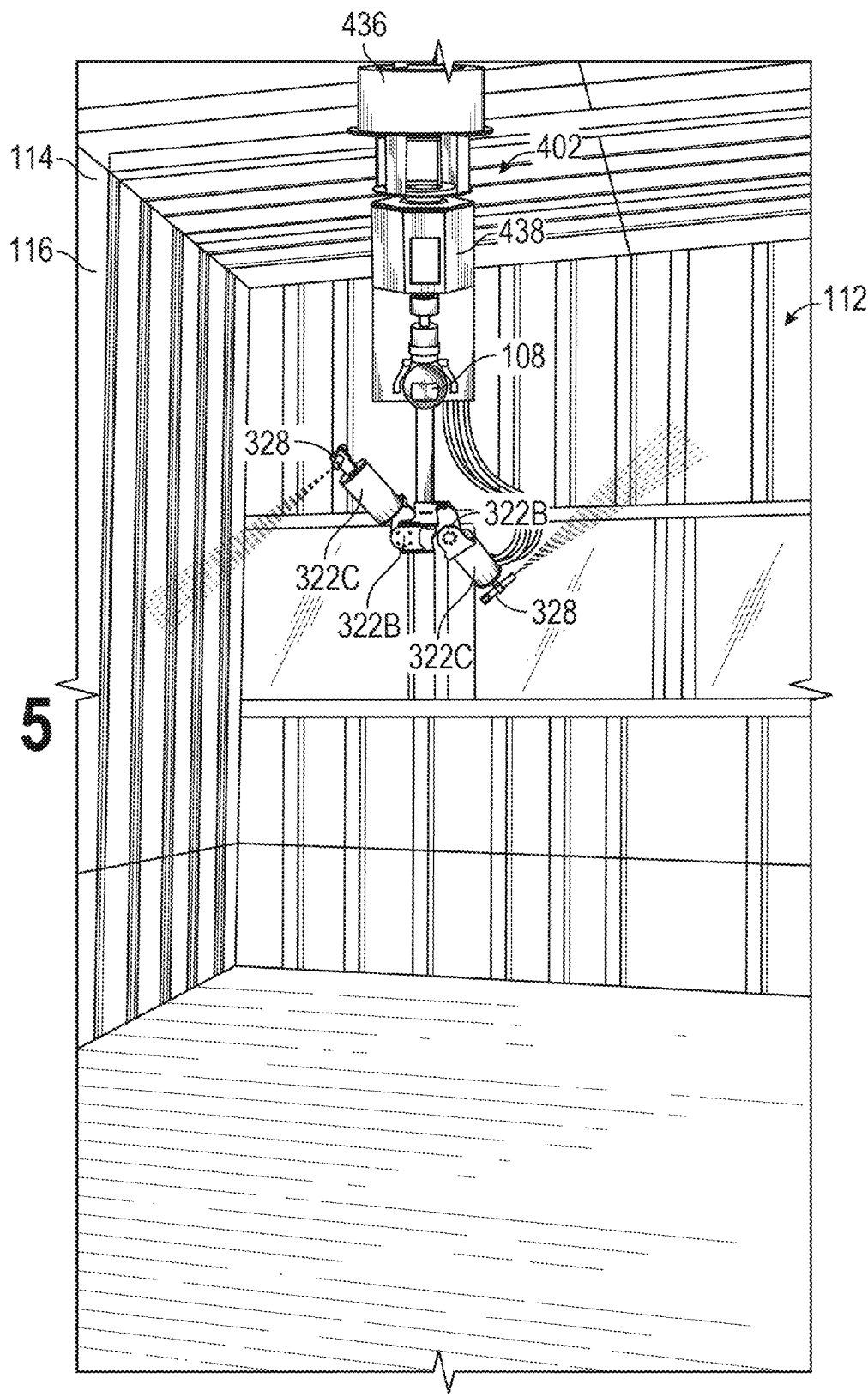
FIG. 5 depicts another view of the example of the cleaning apparatus of FIG. 4.

FIGS. 4 and 5 illustrate another aspect of a cleaning apparatus 402. The cleaning apparatus 402 includes a base 436. In certain cases, a position of the base 436 is maintained relative to the surface 114 during the cleaning process. In other examples, the base 436 may be connected to a movement system (e.g., lifting mechanism, track, rollers, etc.) that allows for movement and positioning of the cleaning apparatus 402 relative to the surface 114.

As illustrated in FIGS. 4 and 5, the cleaning device 106 includes two nozzles 328, each supported on an articulating arm 320A-B. Fewer or additional articulating arms may be provided in other examples. In the example of FIGS. 4 and 5, each articulating arm 320A-B includes two arm segments 322B-C that are positionable about the axes 332A-B and 334A-B, respectively. In other examples, fewer or additional arm segments may be provided with each articulating arm 320A-B. In some examples, the number of arm segments of the articulating arm 320A is the same as the number of arm segments of the articulating arm 320B, although it need not be. In other examples, various other movement mechanisms may be utilized such that the cleaning device 106 is movable relative to the base 436.

In some examples, the articulating arms 320A-B are provided on a support 438 that is connected to the base 436. In some aspects, the support 438 may be movable relative to the base 436, although it need not be. As some examples, the support 438 may be vertically adjustable (see arrow 440) or rotatable (see arrow 442) relative to the base 436 to further position the cleaning device 106. In other examples, the support 438 may utilize various other movement mechanisms. In some aspects, a camera 444 or other monitoring device may be provided with the cleaning apparatus 402. Cleaning apparatus 402 and/or parts thereof are more fully described in the '425 Application and the '320 Application.

Figure 6:
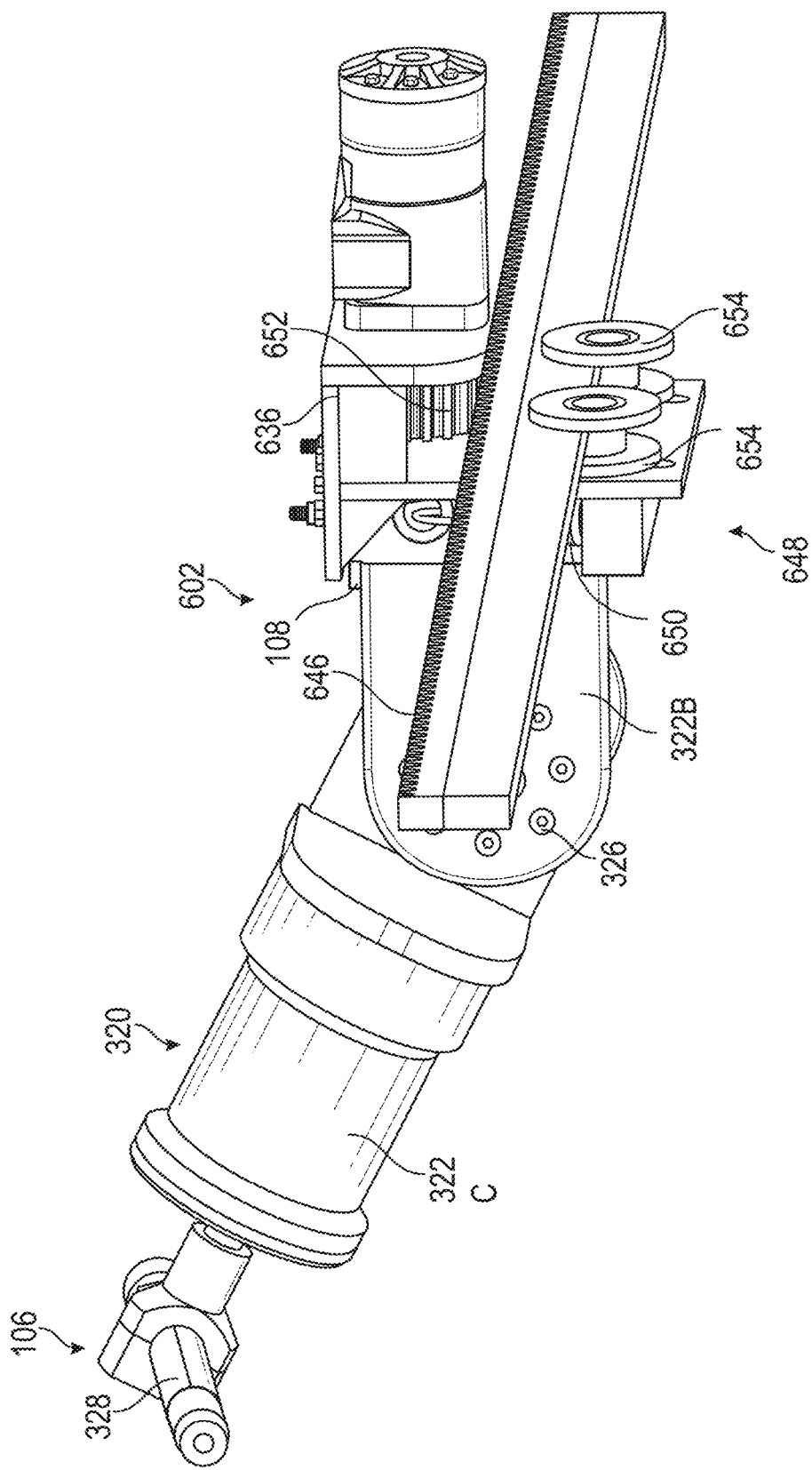
FIG. 6 depicts an example of a cleaning apparatus according to certain aspects of the present disclosure.
Figure 7:
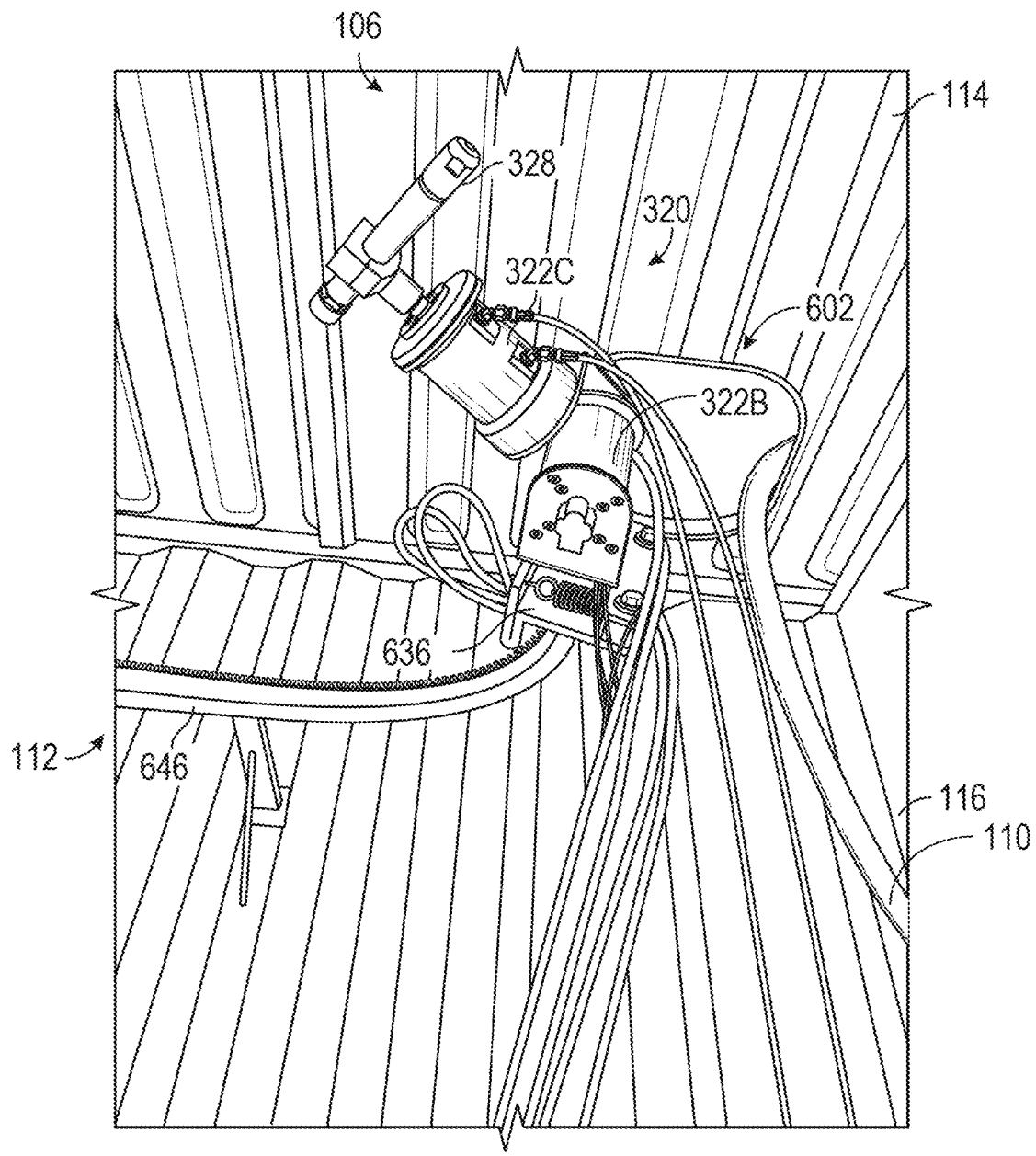
FIG. 7 depicts another view of the example of the cleaning apparatus of FIG. 6.

FIGS. 6 and 7 illustrate another aspect of a cleaning apparatus 602. The cleaning apparatus 602 includes a base 636 that is movable along a track 646. The track 646 can be mounted in the cleaning environment 112 and may be secured to a surface or other suitable location such that the cleaning apparatus 602 is movable within the cleaning environment 112. In some examples, the track 646 extends along multiple axes within the cleaning environment 112 such that the cleaning apparatus 602 is movable through multiple axes. For example, the track 646 may be configured/positioned in a horizontal, vertical, or other suitable manner to allow the cleaning apparatus 602 to move in a multitude of directions during cleaning, including but not limited to horizontal, vertical, circular, and/or spiral directions so as to cover any and all areas of the cleaning environment. As illustrated in FIGS. 6 and 7, the base 636 may include a mounting mechanism 648 for retaining the cleaning apparatus 602 on the track 646 and to provide stability and limit or reduce side-to-side movement of the cleaning apparatus 602. In some examples, the mounting mechanism 648 includes a spring 650, gear 652, and mounting wheels 654, although other suitable mechanisms may be utilized. In some examples, the track 646 may be permanently mounted (natively or through retrofitting) in the cleaning environment or may be removably mounted.

As illustrated in FIGS. 6 and 7, the cleaning device 106 includes a rotatable nozzle 328 supported on the cleaning apparatus 602 through an articulating arm 320. In the example of FIGS. 6 and 7, the articulating arm 320 includes two arms segments 322B-C. In other examples, various other movement mechanisms may be utilized such that the cleaning device 106 is movable relative to the base 636. In the example of FIGS. 6 and 7, the removal device 110 is optionally provided separately from the cleaning apparatus 602. Cleaning apparatus 602 and/or parts thereof are more fully described in the '425 Application and the '320 Application.

Figure 8:
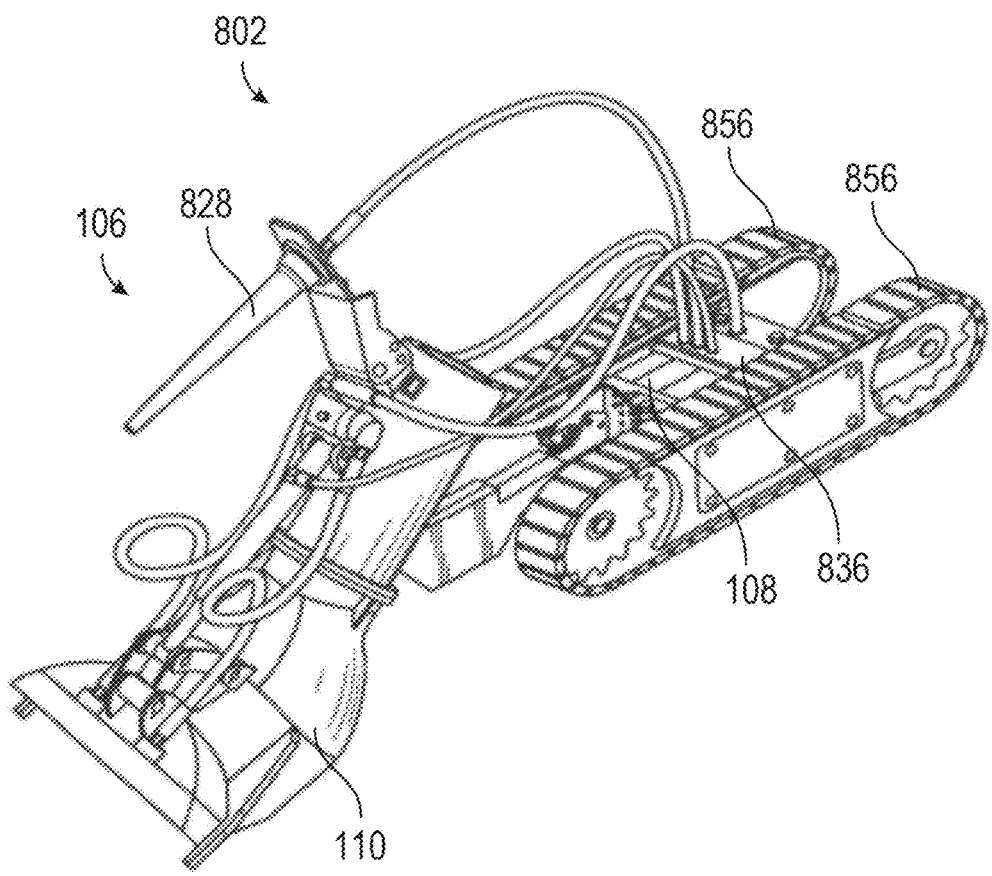
FIG. 8 depicts another example of a cleaning apparatus according to certain aspects of the present disclosure.

FIG. 8 illustrates another example of a cleaning apparatus 802. In this example, the cleaning apparatus includes a base 802 that is supported on a pair of endless tracks 856 such that the cleaning apparatus 802 may be movable along the surface 114. In other aspects, other movement mechanisms for the cleaning apparatus 802 including, but not limited to, wheels, rollers, treads, or other suitable devices may be utilized. As illustrated in FIG. 8, the cleaning device 106 includes a nozzle 828. In other examples, other cleaning devices such as a claw or other tool may be provided. In some aspects, the cleaning device 106 may be supported on the base 836 through an articulating arm or other suitable movement mechanism. Cleaning apparatus 802 and/or parts thereof are more fully described in the '018 Application and the '455 Application.

Figure 9:
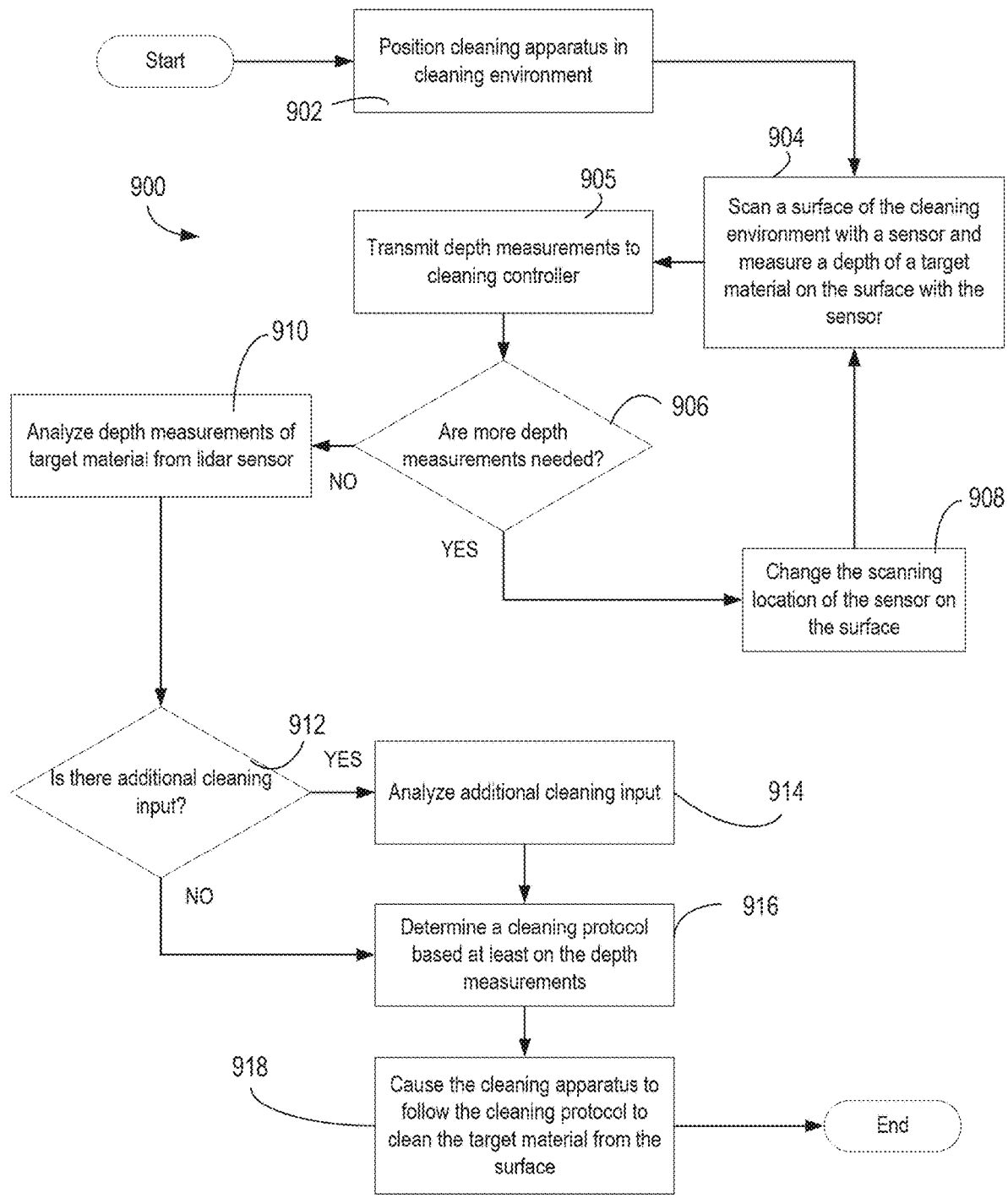
FIG. 9 depicts an example of a method of cleaning a vessel according to certain aspects of the present disclosure.

FIG. 9 depicts an example of a method 900 of cleaning a surface of a cleaning environment. Method 900 is described with respect to one or more examples provided herein. But other implementations are possible.

In a block 902, the method 900 includes positioning the cleaning apparatus 102 in the cleaning environment 112. In some examples, positioning the cleaning apparatus 102 includes lowering the cleaning apparatus 102 through an opening of a vessel 116 such that the cleaning apparatus 102 is positioned within an interior space of the vessel 116 and the surface 114 to be cleaned is an inner surface. In other examples, the surface 114 to be cleaned is an exterior surface, and positioning the cleaning apparatus 102 includes positioning the cleaning apparatus 102 exterior to the vessel 116.

In some examples, in a block 904, the method 900 includes scanning the surface 114 with the sensor 108 and measuring a depth of the target material 118 on the surface 114 to determine differences in target material depth along the surface 114. As described above, the sensor 108 may be a LIDAR sensor that illuminates a particular area of the surface with pulsed laser light and measures an aspect of the reflected pulse (e.g., laser return time, wavelengths, etc.) to determine a depth of the target material 118. In aspects, the block 904 can include scanning the entire surface 114 (or a predefined subset of the surface 114 or predefined locations on the surface 114) and taking a plurality of depth measurements of the target material 118 along the surface 114.

In a block 905, the sensor 108 transmits the depth measurements to the cleaning controller 114 as a data signal. The sensor 108 transmits the data signal continuously or at intervals (which may be transmitted during or after the depth measuring by the sensor 108). In some examples, the sensor 108 transmits the data signal after the sensor 108 has concluded measuring the depth of the target material 118. In some aspects, block 904 is omitted.

In a block 906, the system 100 or 200 determines whether additional depth measurements are needed. In various examples, a minimum number of depth measurements are needed to produce a cleaning protocol. In such examples, the system may compare the number of depth measurements that have been taken with the minimum number of depth measurements. In other examples, a minimum number of locations and/or positions along the surface 114 are needed to produce the cleaning protocol, and in such examples, the system may compare the locations of the depth measurements that have been taken with the minimum number of locations. In further examples, depth measurements must be taken along the entire surface and/or must be taken over a predetermined area (which may be representative of the entire surface). In such examples, the system may compare the area in which the depth measurements have been taken with the overall area of the cleaning surface and/or the predetermined area. In some aspects, block 906 is omitted.

If additional depth measurements are needed, in a block 908 the scanning location of the sensor 108 is changed and the method returns to block 904. Changing the location of the sensor 108 may include, but is not limited to, changing a linear position, a rotational position, the orientation, a scanning speed, etc. of the sensor 108. If additional measurement are not needed, the method proceeds to block 910. In some aspects, block 908 is omitted.

In the block 910, the cleaning controller 104 analyzes the depth measurements from the sensor 108. In some aspects, analyzing the depth measurements includes comparing the measured depth with a predefined depth for a particular location along the surface 114. In some examples, the predefined depth corresponds with a depth of the target material 118 that is considered "clean," although it need not in other examples.

In a block 912, the cleaning controller 104 determines whether any additional cleaning input is available for determining a cleaning protocol. Such a determination may include, but is not limited to, analyzing stored memory or other inputs for a shape or profile of the surface 114, a type of cleaning device 106, a type of cleaning force from the cleaning device 106, a type of material of the target material 118, and/or various other factors as desired.

In such examples, if the additional cleaning input is available, in a block 914, the cleaning controller 104 analyzes the additional cleaning input with the depth measurements before proceeding to a block 916. Analyzing the additional cleaning input may include, but is not limited to, determining whether the additional cleaning input affects a rate of cleaning, location of cleaning, a duration of cleaning, and efficacy of cleaning, etc.

In other examples, if no additional cleaning input is available (or where blocks 912 and 914 are omitted), in the block 916, the cleaning controller 104 determines a cleaning protocol for the cleaning apparatus 102 based at least on the depth measurements from the sensor 108. In some examples, determining the cleaning protocol includes determining the path of movement of the cleaning apparatus 102 within the cleaning environment 112 as well as a location of cleaning by the cleaning apparatus 102 along the surface 114 at a particular time period during a cleaning time period based on the depth measurements. After the cleaning protocol is determined, the cleaning controller 104 transmits a cleaning signal to the cleaning device 106.

In a block 916, the cleaning signal causes the cleaning apparatus 102 to operate pursuant to the cleaning protocol so as to direct the cleaning force on the surface 114 to clean the surface 114 pursuant to the cleaning protocol. For instance, the cleaning signal causes the cleaning apparatus 102 to direct the cleaning force on a predetermined location on the surface 114 for a predetermined time period during the cleaning time period based on the depth measurements following a cleaning path along the surface. In some aspects, the cleaning signal causes the entire cleaning apparatus 102 to move along the surface 114 such that the cleaning apparatus 102 cleans the surface 114 following the predetermined cleaning path. In other examples, the cleaning signal causes the cleaning device 106 to move and/or orient itself relative to a base of the cleaning apparatus 102. As one example, the cleaning signal may cause an articulating arm 320 to move or position the cleaning device 106 relative to a base of the cleaning apparatus 102 to change or control the orientation of the cleaning device 106. For example, the cleaning signal may cause the articulating arm 320 to rotate the arm segment 322A about the axis 330, the arm segment 322B about the axis 332, and/or the arm segment 322C about the axis 334 to position the cleaning device 106 relative to the base of the cleaning device 106. In some examples, the base of the cleaning apparatus 102 may be independently movable relative to the surface (e.g., through tracks, rollers, wheels, or other movement mechanisms as described above) or may be at a fixed location relative to the surface 114.

In some aspects, the cleaning signal also optionally causes the removal device 110 of the cleaning apparatus 102 to remove the targeted material 118 from the cleaning environment after the targeted material 118 has been dislodged (or otherwise removed) from the surface 114 by the cleaning device 106. In some aspects, the cleaning signal causes the removal device 110 to remove the dislodged targeted material 118 through vacuuming or suctioning, although other removal techniques may be utilized.

In some aspects, the method 900 optionally includes measuring an integrity of the surface 114 with the sensor 108. In such optional steps, the cleaning controller 104 sends an integrity signal to the sensor 108 after the cleaning process has concluded, although the targeted material 118 may be transmitted in other time periods in other examples. In various examples, the integrity signal causes the sensor 108 to measure a dimension of the cleaning environment 112. In certain optional steps, the cleaning controller 104 analyzes the measured dimension by comparing the measured dimension to a predefined dimension of the surface 114. In some aspects, the cleaning controller 104 transmits an integrity signal with an integrity alert if the measured dimension deviates from the predefined dimension more than predetermined tolerance levels. In some examples, the cleaning controller 104 may cause the cleaning system 100 to start another cleaning process if the measured dimension is different from the predefined dimension.

The method 900 or any sub-components of the method 900 can be repeated once or any number of times. Moreover, some or all of the blocks of the method 900 may be performed concurrently or sequentially. In certain non-limiting examples, some or all of the blocks of the method 900 are performed concurrently such that the cleaning protocol is updated in real time during a cleaning process. In some examples, cleaning will be discontinued when the cleaning controller 104 analyzes the depth measurements from the sensor 108 and determines that the depth measurements indicate that the vessel is "clean."

FIG. 10 illustrates an example of a method 1000 of cleaning a surface of a cleaning environment. Method 1000 is described with respect to one or more examples provided herein. But other implementations are possible.

In a block 1002, the method 1000 includes positioning the cleaning apparatus 102 in the cleaning environment 112. Block 1002 can be implemented in a manner similar to block 902 of method 900.

In a block 1004, the method includes causing the cleaning apparatus 102 to clean the target material 118 from the surface 114 of the cleaning environment 112 pursuant to an initial cleaning protocol. The initial cleaning protocol may be random or may follow a predefined path. By way only of example, the cleaning controller 104 could determine an initial cleaning protocol based on one or more factors and send cleaning signals to the cleaning apparatus 102 such that the cleaning apparatus 102 performs cleaning pursuant to the initial cleaning protocol. The one or more factors can include, but are not limited to, the size of the area or surface to be cleaned, the amount of target material to be cleaned, the type of vessel, the shape or geometry of the vessel, the type of material to be cleaned, etc. Block 1004 can be performed once or more than once before proceeding to block 1006.

In a block 1006, the method includes scanning the surface 114 with the sensor 108 and measuring a depth of the target material 118 on the surface 114 to determine differences in target material depth along the surface 114. In such examples, the scanning by the sensor 108 may optionally be used by the cleaning controller 104 to determine the efficacy of the cleaning of the surface 114 from block 1004. For example, the cleaning controller 104 may compare the measured depth with a predefined depth that is considered "clean." In such examples, deviations from the predefined depth may indicate a surface integrity problem and/or that additional cleaning is needed. Block 1006 can be implemented in a manner similar to block 904 of method 900.

In a block 1007, the method includes transmitting the depth measurements from the sensor 108 to the cleaning controller 114 as a data signal. Block 1007 can be implement in a manner similar to block 905 of method 900.

In a block 1008, the method 1000 includes determining whether additional depth measurements are needed. Block 1008 can be implemented in a manner similar to block 906 of method 900.

In a block 1010, the method 1000 includes changing the scanning location of the sensor 108 if additional depth measurements are needed. Block 1010 can be implemented in a manner similar to block 908 of method 900.

In a block 1012, the method includes analyzing the depth measurements of the target material from the sensor 108. Block 1012 can be implemented in a manner similar to block 910 of method 900.

In some aspects, in a block 1014, the cleaning controller 104 determines whether any additional cleaning input is available for determining a subsequent cleaning protocol. Block 1014 can be implemented in a manner similar to block 912 of method 900.

If the additional cleaning input is available, in a block 1016, the cleaning controller 104 analyzes the additional cleaning input with the depth measurements before proceeding to a block 1018. Block 1016 can be implemented in a manner similar to block 914 of method 900.

If no additional cleaning input is available (or where optional blocks 1014 and 1016 are omitted), in the block 1018, the cleaning controller 104 determines a subsequent cleaning protocol for the cleaning apparatus 102 based at least on the depth measurements from the sensor 108. Block 1018 can be implemented in a manner similar to block 916 of method 900.

In a block 1020, a cleaning signal is transmitted from the cleaning controller 104 to the cleaning apparatus 102 to cause the cleaning apparatus 102 to follow the subsequent cleaning protocol so as to direct the cleaning force on the surface 114 to clean the surface 114 pursuant to the subsequent cleaning protocol. Block 1020 can be implemented in a manner similar to block 918 of method 900.

One, some, or all of steps 1006, 1007, 1008, 1010, 1012, 1014, 1016, 1018, and 1020 in method 1000 can be repeated once or any number of times. In various examples, cleaning will be discontinued when the cleaning controller 104 analyzes the depth measurements from the sensor 108 and determines that the depth measurements indicate that the vessel is "clean."

Similar to the method 900, the method 1000 may also optionally includes the steps for removing the target material from the cleaning environment after the targeted material 118 has been removed from the surface by the cleaning device 106. The method 1000 may also include the optional steps of determining an integrity of the surface 114 as described above with reference to the method 900.

Cleaning using the system 100 or the system 200 eliminates the need to expose users to extreme environments that may pose a safety risk. Moreover, cleaning using the system 100 or the system 200 provides an effective cleaning mechanism that increases the speed of vessel cleaning, improves energy efficiency of the cleaning system 100 or the system 200, and reduces waste. Such systems may further ensure that a predefined level of cleanliness is achieved during the cleaning process before the surfaces are used.

A collection of exemplary examples, including at least some explicitly enumerated as "ECs" (Example Combinations), providing additional description of a variety of example types in accordance with the concepts described herein are provided below. These examples are not meant to be mutually exclusive, exhaustive, or restrictive; and the invention is not limited to these example examples but rather encompasses all possible modifications and variations within the scope of the issued claims and their equivalents.

EC 1. A method of cleaning a vessel having a size and a shape and defining a cleaning environment, wherein the vessel comprises a surface having a target material on the surface to be cleaned, the method comprising: positioning a cleaning apparatus in the cleaning environment of the vessel, wherein the cleaning apparatus comprises a sensor and a cleaning device, wherein the cleaning device generates a cleaning force; measuring, with the sensor, a plurality of depth measurements of the target material to be cleaned from the surface; communicating the plurality of depth measurements to a cleaning processing device; determining, by the cleaning processing device and based at least in part on the plurality of depth measurements, a cleaning protocol for the cleaning device to perform; and controlling, by the cleaning processing device, the cleaning apparatus by causing the cleaning device to apply the cleaning force to the surface pursuant to the cleaning protocol.

EC 2. The method of any of the preceding or subsequent example combinations, further comprising determining a type of cleaning force of the cleaning device, wherein determining the cleaning protocol further comprises determining the cleaning protocol at least partially based on the type of cleaning force.

EC 3. The method of any of the preceding or subsequent example combinations, wherein the cleaning apparatus comprises a track-mounted base that is movable along the surface, and wherein controlling the cleaning apparatus comprises moving the cleaning apparatus along the surface while causing the cleaning device to apply the cleaning force.

EC 4. The method of any of the preceding or subsequent example combinations, wherein the cleaning apparatus comprises an arm on the base and supporting the cleaning device, wherein the arm comprises: a first rotatable arm member defining a first axis, wherein the first rotatable arm member is rotatable about the first axis; and a second rotatable arm member defining a second axis and connected to the first rotatable arm member, wherein the second rotatable arm member is rotatable about the second axis, and wherein controlling the cleaning apparatus comprises controlling an orientation of the cleaning device by moving at least one of the first rotatable arm member or the second rotatable arm member while causing the cleaning device to provide the cleaning force.

EC 5. The method of any of the preceding or subsequent example combinations, wherein the cleaning apparatus comprises a base and an arm on the base supporting the cleaning device, wherein the arm comprises: a first rotatable arm member defining a first axis, wherein the first rotatable arm member is rotatable about the first axis; and a second rotatable arm member defining a second axis and connected to the first rotatable arm member, wherein the second rotatable arm member is rotatable about the second axis, and wherein controlling the cleaning apparatus comprises maintaining a position of the base relative to the surface and controlling an orientation of the cleaning device by moving at least one of the first rotatable arm member or the second rotatable arm member while causing the cleaning device to provide the cleaning force.

EC 6. The method of any of the preceding or subsequent example combinations, wherein determining the cleaning protocol further comprises determining the cleaning protocol at least partially based on the size and/or shape of the vessel.

EC 7. The method of any of the preceding or subsequent example combinations, further comprising: removing from the cleaning environment the target material cleaned from the surface by the cleaning apparatus; measuring, by the sensor, a dimension of the cleaning environment; comparing, by the cleaning processing device, the measured dimension to a predefined dimension; providing an integrity alert based on the measured dimension being greater than the predefined dimension; measuring with the sensor a second plurality of depth measurements along the surface based on the measured dimension being less than the predefined dimension; determining, by the cleaning processing device, a second cleaning protocol for the cleaning device on the surface based on the second plurality of depth measurements; and controlling, by the cleaning processing device, the cleaning apparatus by causing the cleaning device provide the cleaning force to the surface pursuant to the second cleaning protocol.

EC 8. The method of any of the preceding or subsequent example combinations, wherein the sensor is a LIDAR sensor.

EC 9. The method of any of the preceding or subsequent example combinations, wherein determining the cleaning protocol comprises determining a cleaning time for locations on the surface and a cleaning orientation of the cleaning device relative to the respective locations during the respective cleaning times, wherein controlling the cleaning apparatus comprises causing the cleaning device to provide, at each location, the cleaning force for the cleaning time at the cleaning orientation for that location.

EC 10. The method of any of the preceding or subsequent example combinations, further comprising causing the cleaning apparatus to clean the surface pursuant to an initial cleaning protocol before measuring the plurality of depth measurements.

EC 11. A cleaning system for cleaning a vessel having a size and a shape defining a cleaning environment, wherein the vessel comprises a surface having a target material on the surface to be cleaned, the cleaning system comprising: a cleaning apparatus positionable in the cleaning environment of the vessel, the cleaning apparatus comprising: a sensor configured to measure a depth of the target material on the surface of the vessel; and a cleaning device, wherein the cleaning device is configured to generate a cleaning force; and a cleaning processing device, wherein the cleaning processing device is configured to receive from the sensor a plurality of depth measurements of the target material on the surface, determine a cleaning protocol for the cleaning device based at least in part on the plurality of depth measurements, and control the cleaning apparatus to cause the cleaning device to apply the cleaning force to the surface pursuant to the cleaning protocol.

EC 12. The cleaning system of any of the preceding or subsequent example combinations, wherein the cleaning apparatus comprises a track-mounted base that is movable along the surface, and wherein the cleaning processing device is configured to move the cleaning apparatus along the surface while causing the cleaning device to provide the cleaning force.

EC 13. The cleaning system of any of the preceding or subsequent example combinations, wherein the cleaning apparatus comprises an arm on the base and supporting the cleaning device, wherein the arm comprises: a first rotatable arm member defining a first axis, wherein the first rotatable arm member is rotatable about the first axis; and a second rotatable arm member defining a second axis and connected to the first rotatable arm member, wherein the second rotatable arm member is rotatable about the second axis, and wherein the cleaning processing device is configured to move at least one of the first rotatable arm member or the second rotatable arm member while causing the cleaning device to provide the cleaning force.

EC 14. The cleaning system of any of the preceding or subsequent example combinations, wherein the cleaning apparatus comprises a base and an arm on the base supporting the cleaning device, wherein the arm comprises: a first rotatable arm member defining a first axis, wherein the first rotatable arm member is rotatable about the first axis; and a second rotatable arm member defining a second axis and connected to the first rotatable arm member, wherein the second rotatable arm member is rotatable about the second axis, and wherein the cleaning processing device is configured to maintain a position of the base relative to the surface and move at least one of the first rotatable arm member or the second rotatable arm member while causing the cleaning device to provide the cleaning force.

EC 15. The cleaning system of any of the preceding or subsequent example combinations, wherein the cleaning processing device is on the cleaning apparatus.

EC 16. The cleaning system of any of the preceding or subsequent example combinations, wherein the cleaning device comprises a nozzle configured to emit at least one of heat, a fluid, a high-intensity light, acoustic waves, or sonic waves as the cleaning force.

EC 17. The cleaning system of any of the preceding or subsequent example combinations, wherein the cleaning apparatus further comprises a removal device configured to remove the target material.

EC 18. The cleaning system of any of the preceding or subsequent example combinations, wherein the sensor is a LIDAR sensor.

EC 19. The cleaning system of any of the preceding or subsequent example combinations, wherein the cleaning protocol comprises at least one of path of movement of the cleaning device within the cleaning environment, speed of movement of the cleaning device within the cleaning environment, duration and/or strength of the cleaning force on a particular location on the surface, and orientation of the cleaning apparatus relative to the particular location on the surface.

EC 20. The cleaning system of any of the preceding or subsequent example combinations, wherein the cleaning processing device is configured to determine the cleaning protocol for the cleaning device based further on at least one of the size and/or shape of the vessel and the type of cleaning force of the cleaning of the cleaning device.

EC 21. The cleaning system of any of the preceding or subsequent example combinations, wherein the cleaning device comprises at least one of a claw or a nozzle.

EC 22. The cleaning system of any of the preceding or subsequent example combinations, wherein the cleaning processing device is remote from the cleaning apparatus.

The above-described aspects are merely possible examples of implementations, merely set forth for a clear understanding of the principles of the present disclosure. Many variations and modifications can be made to the above-described aspect(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

The invention claimed is:

1. A method of cleaning a vessel having a size and a shape and defining a cleaning environment, wherein the vessel comprises a surface having a target material on the surface to be cleaned, the method comprising:
   positioning a cleaning apparatus in the cleaning environment of the vessel, wherein the cleaning apparatus comprises a sensor and a cleaning device, wherein the cleaning device generates a cleaning force;
   measuring, with the sensor, a first plurality of depth measurements of the target material to be cleaned from the surface;
   communicating the first plurality of depth measurements to a cleaning controller having a cleaning processing device;
   determining, by the cleaning controller and based at least in part on the plurality of depth measurements, a first cleaning protocol for the cleaning device to perform;
   controlling, by the cleaning controller, the cleaning apparatus by causing the cleaning device to apply the cleaning force to the surface pursuant to the first cleaning protocol;
   removing from the cleaning environment the target material cleaned from the surface by the cleaning apparatus;
   measuring, by the sensor, a dimension of the cleaning environment;
   comparing, by the cleaning controller, the measured dimension to a predefined dimension;
   providing an integrity alert based on the measured dimension being greater than the predefined dimension;
   measuring with the sensor a second plurality of depth measurements along the surface based on the measured dimension being less than the predefined dimension;
   determining, by the cleaning controller, a second cleaning protocol for the cleaning device on the surface based on the second plurality of depth measurements; and
   controlling, by the cleaning controller, the cleaning apparatus by causing the cleaning device provide the cleaning force to the surface pursuant to the second cleaning protocol.

2. The method of claim 1, further comprising determining a type of cleaning force of the cleaning device, wherein determining the first cleaning protocol further comprises determining the first cleaning protocol at least partially based on the type of cleaning force.

3. The method of claim 1, wherein the cleaning apparatus comprises a base and an arm on the base supporting the cleaning device, wherein the arm comprises:
   a first rotatable arm member defining a first axis, wherein the first rotatable arm member is rotatable about the first axis; and
   a second rotatable arm member defining a second axis and connected to the first rotatable arm member, wherein the second rotatable arm member is rotatable about the second axis, and
   wherein controlling the cleaning apparatus comprises maintaining a position of the base relative to the surface and controlling an orientation of the cleaning device by moving at least one of the first rotatable arm member or the second rotatable arm member while causing the cleaning device to provide the cleaning force.

4. The method of claim 1, wherein determining the first cleaning protocol further comprises determining the first cleaning protocol at least partially based on the size and/or shape of the vessel.

5. The method of claim 1, wherein the sensor is a LIDAR sensor.

6. The method of claim 1, wherein determining the first cleaning protocol comprises determining a cleaning time for locations on the surface and a cleaning orientation of the cleaning device relative to the respective locations during the respective cleaning times, wherein controlling the cleaning apparatus comprises causing the cleaning device to provide, at each location, the cleaning force for the cleaning time at the cleaning orientation for that location.

7. The method of claim 1, further comprising causing the cleaning apparatus to clean the surface pursuant to an initial cleaning protocol before measuring the plurality of depth measurements.

8. The method of claim 1, wherein the cleaning apparatus comprises a track-mounted base that is movable along the surface, and wherein controlling the cleaning apparatus comprises moving the cleaning apparatus along the surface while causing the cleaning device to apply the cleaning force.

9. The method of claim 8, wherein the cleaning apparatus comprises an arm on the base and supporting the cleaning device, wherein the arm comprises:
   a first rotatable arm member defining a first axis, wherein the first rotatable arm member is rotatable about the first axis; and
   a second rotatable arm member defining a second axis and connected to the first rotatable arm member, wherein the second rotatable arm member is rotatable about the second axis, and
   wherein controlling the cleaning apparatus comprises controlling an orientation of the cleaning device by moving at least one of the first rotatable arm member or the second rotatable arm member while causing the cleaning device to provide the cleaning force.

10. A cleaning system for cleaning a vessel having a size and a shape defining a cleaning environment, wherein the vessel comprises a surface having a target material on the surface to be cleaned, the cleaning system comprising:
   a cleaning apparatus adapted to be positioned within the cleaning environment of the vessel, the cleaning apparatus comprising:
     a cleaning apparatus base;
     a first sensor supported on the cleaning apparatus base and configured to measure a depth of the target material on the surface of the vessel;
     a cleaning device coupled to the cleaning apparatus base, wherein the cleaning device is configured to generate a cleaning force; and
     a second sensor supported on the cleaning apparatus base and configured to detect a position of the cleaning device, wherein the second sensor comprises a wireless sensor; and
   a cleaning controller, wherein the cleaning controller is configured to:
     receive from the first sensor a plurality of depth measurements of the target material on the surface,
     determine a cleaning protocol for the cleaning device based at least in part on the plurality of depth measurements, and
     control the cleaning apparatus to cause the cleaning device to apply the cleaning force to the surface pursuant to the cleaning protocol.

11. The cleaning system of claim 10, wherein the cleaning apparatus comprises an arm on the cleaning apparatus base supporting the cleaning device, wherein the arm comprises:
   a first rotatable arm member defining a first axis, wherein the first rotatable arm member is rotatable about the first axis; and
   a second rotatable arm member defining a second axis and connected to the first rotatable arm member, wherein the second rotatable arm member is rotatable about the second axis, and
   wherein the cleaning controller is configured to maintain a position of the base relative to the surface and move at least one of the first rotatable arm member or the second rotatable arm member while causing the cleaning device to provide the cleaning force.

12. The cleaning system of claim 10, wherein the cleaning controller is provided on the cleaning apparatus.

13. The cleaning system of claim 10, wherein the cleaning device comprises a nozzle configured to emit at least one of heat, a fluid, a high-intensity light, acoustic waves, or sonic waves as the cleaning force.

14. The cleaning system of claim 10, wherein the cleaning apparatus further comprises a removal device configured to remove the target material.

15. The cleaning system of claim 10, wherein the sensor is a LIDAR sensor.

16. The cleaning system of claim 10, wherein the cleaning protocol comprises at least one of path of movement of the cleaning device within the cleaning environment, speed of movement of the cleaning device within the cleaning environment, duration and/or strength of the cleaning force on a particular location on the surface, and orientation of the cleaning apparatus relative to the particular location on the surface.

17. The cleaning system of claim 10, wherein the cleaning controller is configured to determine the cleaning protocol for the cleaning device based further on at least one of the size and/or shape of the vessel and the type of cleaning force of the cleaning of the cleaning device.

18. The cleaning apparatus of claim 10, wherein the cleaning controller is further configured to:
   receive from the second sensor a detected position of the cleaning device; and
   compare the detected position to a desired position in accordance with the cleaning protocol; and
   move the cleaning apparatus based on a difference between the detected position and the desired position.

19. The cleaning system of claim 10, wherein the cleaning apparatus base is track-mounted and is movable along the surface, and wherein the cleaning controller is configured to move the cleaning apparatus along the surface while causing the cleaning device to provide the cleaning force.

20. The cleaning system of claim 19, wherein the cleaning apparatus comprises an arm on the base and supporting the cleaning device, wherein the arm comprises:
   a first rotatable arm member defining a first axis, wherein the first rotatable arm member is rotatable about the first axis; and
   a second rotatable arm member defining a second axis and connected to the first rotatable arm member, wherein the second rotatable arm member is rotatable about the second axis, and
   wherein the cleaning controller is configured to move at least one of the first rotatable arm member or the second rotatable arm member while causing the cleaning device to provide the cleaning force.

\* \* \* \* \*